Jan. 15, 1929.

E. H. BALDWIN 1,698,870

COOKING PLATE

Filed Jan. 12, 1928

Inventor
Edmond H. Baldwin
By M. C. Frank
Attorney

Patented Jan. 15, 1929.

1,698,870

UNITED STATES PATENT OFFICE.

EDMOND H. BALDWIN, OF OAKLAND, CALIFORNIA.

COOKING PLATE.

Application filed January 12, 1928. Serial No. 246,119.

My invention relates broadly to cooking implements, but more particularly to cooking plates of a character for placement between a cooking vessel and the source of heat.

The objects of my invention include a cooking plate of unitary construction marketable as a separate article of manufacture; a plate adapted to prevent the scorching of utensils and the burning of the food therein; a plate adapted to allow the free circulation of air under the pan; and a plate of such design and structure which, by its use, will eliminate the heretofore necessary constant watching and stirring of foods such as jams, jellies and other preserves to prevent them from burning.

The invention possesses other advantageous features, some of which, with the foregoing, will be set forth at length in the following description where I shall outline in full that form of the invention which I have selected for illustration in the drawings accompanying and forming part of the present specification. In said drawings I have shown one form of my invention, but it is to be understood that I do not limit myself to such form, since the invention, as expressed in the claims, may be embodied in a plurality of forms.

Referring to said drawings.

Figure 1:
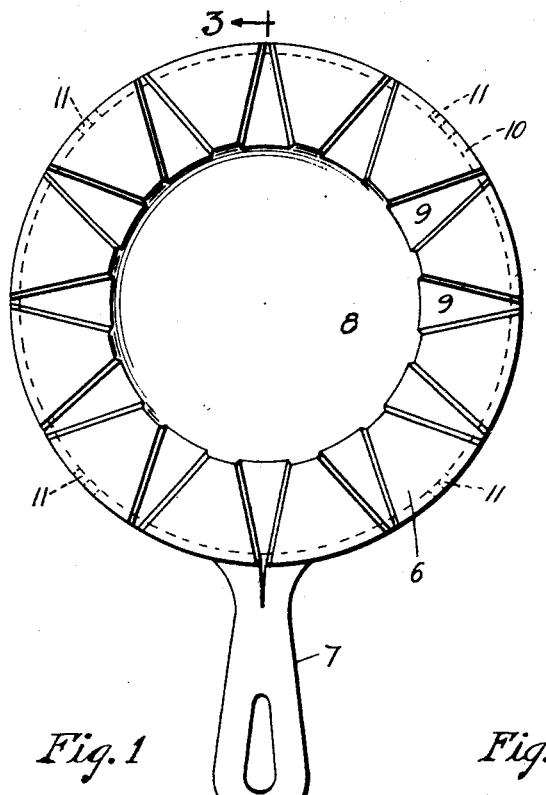
Figure 1 is a top plan of a cooking plate embodying my invention.
Figure 2:
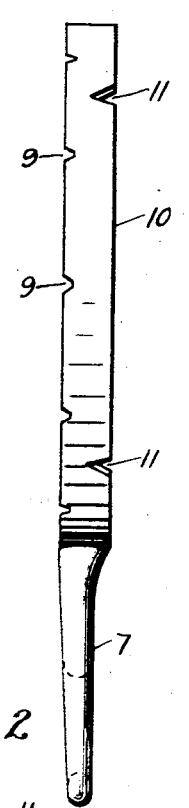
Fig. 2 is a side edge view of the same.
Figure 3:
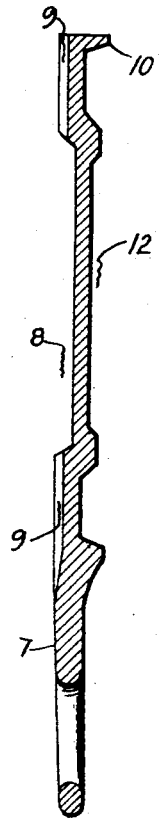
Fig. 3 is a mid-section of the plate taken along the line 3—3 of Fig. 1.
Figure 4:
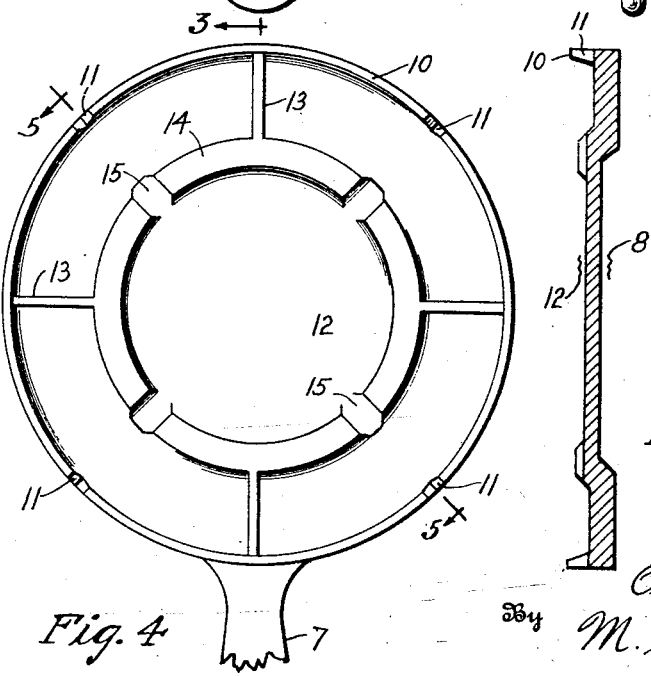
Fig. 4 is a bottom plan of the plate, and Fig. 5 a mid-section thereof taken along the line 5—5.
Figure 5:
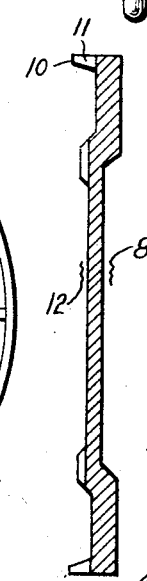

I will now describe my invention in detail.

The numeral 6 indicates the body portion of the device and 7 the handle therefor. The body is preferably made of cast iron and shaped cylindrical, as shown, but other shapes would also be serviceable. The top side of the body is provided with a concentric recess 8, and radiating therefrom to the circumferential periphery of the body is a series of additional recesses 9 but of less depth than the central recess 8, for a purpose to be presently set forth. Each recess 9 of the series is tapered, the smallest cross-sectional area thereof being at the circumference. At the circumference of the body is formed a depending flange 10, which flange has one or more notches or passages 11 therein to serve as a vent flue. The passages are preferably situated between a pair of recesses 9.

The bottom side of the plate or body in conjunction with the depending flange 10, forms a heat-retaining chamber 12, the open side of which would be defined by the plane of the bottom edge of the flange. The bottom side of the plate is reinforced by cross ribs 13 and a ring rib 14, the latter being grooved as at 15 in alignment with the passages 11 to aid them in venting the chamber 12.

In operation, the cooking plate is placed, top side uppermost, upon a heating surface, such as the top of a gas plate, coal or electric stove, and then upon the top side of my cooking appliance may be placed any utensil containing food to be cooked.

It is to be noted that when my device is in service upon a heating surface, the heat-retaining chamber 12 is in effect, and heat can escape from this chamber by the vent passages 11; these passages being small, by design, retain the heat and thus less fuel may be burned. And further, if the cooking utensil on the top of the plate be substantially the diameter thereof, the recess 8 together with the series of recesses 9 will form a second heat-retaining chamber, thus double protection is afforded foods likely to burn in the ordinary manner of cooking, namely, bottom of pan in direct contact with heating surface or gas flame. This is especially true with milk, and it is obvious that my device is ideal for the safe heating of milk regardless of any erroneous length of time a busy mother might leave the milk on the stove.

The diameter of the cooking utensil will determine the heat-retention period in the upper chamber, as it will be noted that the cross-sectional areas of the vent recesses 9 vary inversely with the radius of the utensil on the plate. Finally if the diameter of the utensil be less than that of the recess 8, the bottom of the utensil will directly contact the bottom of the recess and thus only one heat-retaining chamber 12 will be utilized; the food therein will be cooked quicker but the assurance of it not being burned is still present.

In some instances for certain types of cooking utensils, it might be desirable to reverse my cooking plate for service. This can be done and successfully attain the objects of my invention, however, for general use in the average home, I recommend the radial-grooved side to be uppermost.

While I have thus described the preferred form of my invention, I wish to have it understood that changes may be made within the scope of the claims hereto attached without affecting the spirit of the invention, therefore, what I claim as new and desire to secure by Letters Patent of the United States, is the following:

1. In a cooking implement of the character described, a plate provided with a series of vent recesses on its top side, the recesses being radially disposed and tapered with the smallest cross-sectional area thereof at the circumference of the plate for retarding the heat escaping through said recesses, the said plate being further provided with a central recess on its top side of greater depth than said series of recesses and communicative with said series of recesses.

2. In a cooking implement of the character described, a plate provided with a series of vent recesses on its top side, the recesses being radially disposed and tapered with the smallest cross-sectional area thereof at the circumference of the plate for retarding the heat escaping through said recesses, the said plate being further provided with a central recess on its top side of greater depth than said series of recesses and communicative with said series of recesses, and said plate having a depending flange at said circumference to define a heat-retaining chamber between the bottom of the plate and the plane of the bottom edge of the flange.

3. In a cooking implement of the character described, a plate provided with a series of vent recesses on its top side, the recesses being radially disposed and tapered with the smallest cross-sectional area thereof at the circumference of the plate for retarding the heat escaping through said recesses, the said plate being further provided with a central recess on its top side of greater depth than said series of recesses and communicative with said series of recesses, said plate having a depending flange at said circumference to define a heat-retaining chamber between the bottom of the plate and the plane of the bottom edge of the flange, and said flange provided with a passage to vent the said chamber.

In testimony whereof, I affix my signature.

EDMOND H. BALDWIN.